United States Patent [19]

Aisaka et al.

[11] 4,400,346
[45] Aug. 23, 1983

[54] CONTROL RODS

[75] Inventors: Tatsuyoshi Aisaka; Mituo Kawai; Suteto Hasegawa, all of Yokohama; Takeo Nawai, Kokubunji, all of Japan

[73] Assignee: Tokyo Shibaura Denki Kabushiki Kaisha, Kanagawa, Japan

[21] Appl. No.: 189,329

[22] Filed: Sep. 22, 1980

[30] Foreign Application Priority Data

Sep. 29, 1979 [JP] Japan .................................. 54-124753

[51] Int. Cl.³ .............................................. G21C 7/10
[52] U.S. Cl. .................................... 376/327; 376/353;
29/434; 308/DIG. 4
[58] Field of Search ............... 376/327, 353, 442, 449,
376/463, 446; 308/6 R, 6 A, 18, 19, DIG. 4;
29/434, 724, 116 R, 110

[56] References Cited

U.S. PATENT DOCUMENTS

| 3,332,850 | 7/1967 | Jonsson et al. | 376/327 |
| 3,377,254 | 4/1968 | Frisch | 376/446 |
| 3,389,056 | 6/1968 | Frisch | 376/442 |
| 3,622,211 | 11/1971 | Mitton | 308/6 R |
| 3,733,252 | 5/1973 | Georges et al. | 376/442 |
| 3,791,466 | 2/1974 | Patterson et al. | 376/449 |
| 3,815,293 | 6/1974 | Karbowski | 308/6 R |
| 3,837,553 | 9/1974 | Bock | 29/116 R |

FOREIGN PATENT DOCUMENTS

| 2643924 | 4/1978 | Fed. Rep. of Germany | 376/353 |
| 4750917 | 3/1967 | Japan | 376/353 |
| 54-112488 | 3/1979 | Japan | 376/353 |

Primary Examiner—Harvey E. Behrend
Attorney, Agent, or Firm—Stevens, Davis, Miller & Mosher

[57] ABSTRACT

A control rod to be arranged in a nuclear reactor core comprises a body of a control rod, control rod guide rollers, pins connected to the guide rollers, and fixing members directly welded to the body of the control rod. The pins slidably support the respective guide rollers and the fixing members are engaged with the pins with a small clearance therebetween so as not to transfer welding heat from the fixing member to the pin.

2 Claims, 15 Drawing Figures

CONTROL RODS

BACKGROUND OF THE INVENTION

This invention relates to control rods to be arranged in a nuclear reactor core, each control rod being provided with supporting pins for supporting control rod guide rollers and fixing members to be secured to the control rod and engaged with the supporting pins thereby preventing the rotation thereof.

In a nuclear reactor core, control rods are located for regulating and distributing power generated in the nuclear reactor. As shown in FIG. 1, each control rod 3 is generally provided with four control rod guide rollers 1 supported by supporting pins 2 at upper and lower portions, respectively, of the control rod 3 so that the control rod will be exactly and smoothly inserted into or withdrawn from the reactor core.

Generally, the control rod guide roller supporting pins 2 are made of a cobalt-based alloy which is hardened by cold working and aging treatment and are directly welded to the control rod 3 as shown in FIGS. 2a through 2d and designated by reference numeral 4 in view of the fact that the supporting pins 2 are slidably engaged with the control rod guide roller 1 under friction.

However, in such a case as described above, since the supporting pin 2 is directly welded to the control rod 3, welding heat transfers to the internal central portion of the pin 2, thus softening the pin itself, degrading the quality of the material thereof as well as increasing the possibility of cracks due to corrosion and strain. The exact control of the amount of the welding heat is considerably difficult in practice.

SUMMARY OF THE INVENTION

An object of this invention is to obviate defects described above and to provide a control rod provided with fixing members secured to the control rod and control rod guide roller supporting pins which are engaged with the fixing member with some clearance.

According to this invention, there is provided a control rod to be arranged in a nuclear reactor core characterized by comprising a body of a control rod, control rod guide rollers attached to the body of the control rod, pins connected to the guide rollers for slidably supporting the same, and fixing members secured to the body of the control rod and adapted to engage the pins respectively with a clearance therebetween.

BRIEF DESCRIPTION OF DRAWINGS

In the accompanying drawings:

FIG. 9a shows a control rod provided with a supporting pin according to prior art and FIG. 9c shows a hardness distribution of the supporting pin attached to the control rod as shown in FIG. 9a.

DESCRIPTION OF THE PREFERRED EMBODIMENTS

Figure 1:
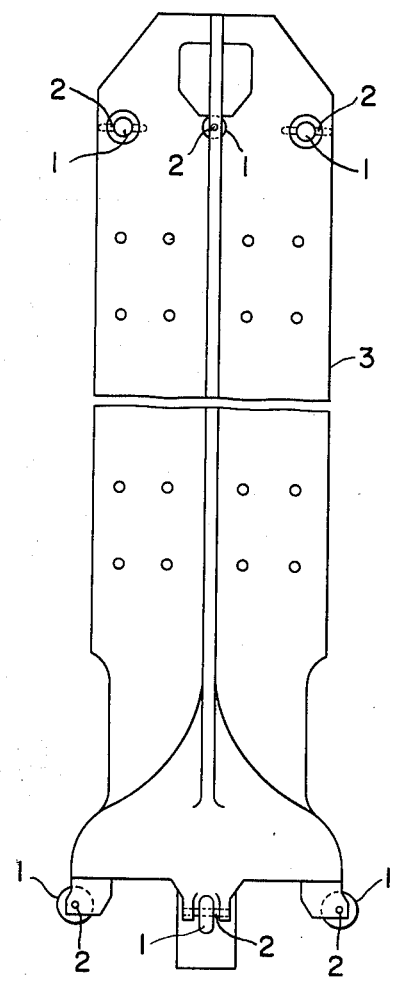
FIG. 1 shows a schematic view of a control rod to be arranged in a nuclear reactor core.
Figure 2A:
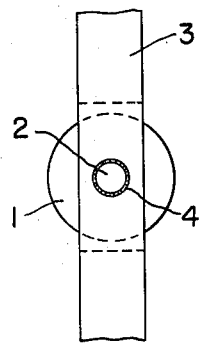
FIGS. 2a through 2d show schematic views in which a control rod guide roller supporting pin is directly secured to the body of a control rod.
Figure 2B:
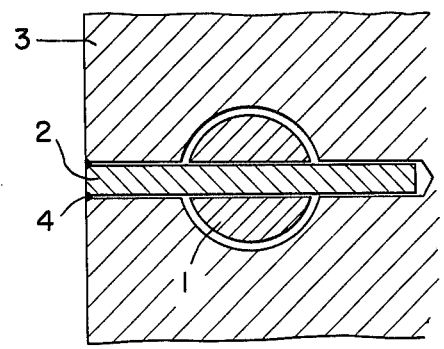
Figure 2C:
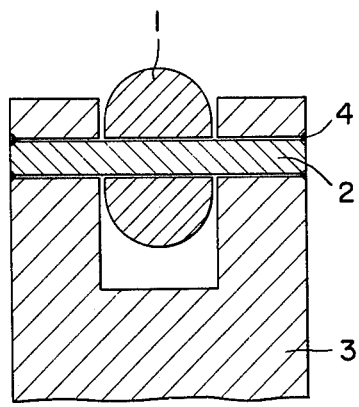
Figure 2D:
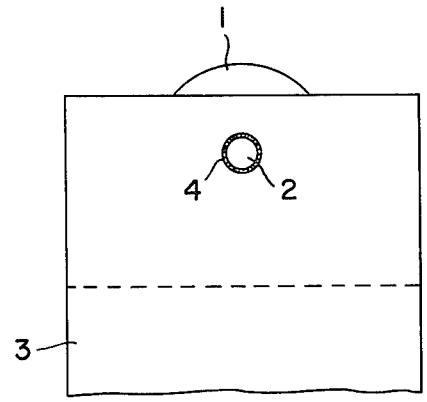
Figure 3:
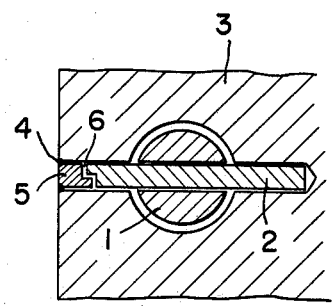
FIGS. 3 through 8 show embodiments of control rods according to this invention.
Figure 6:
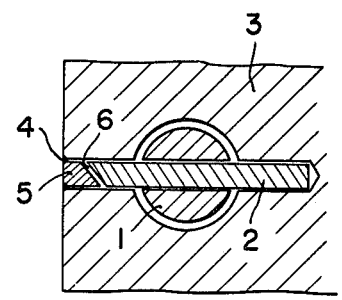
Figure 4:
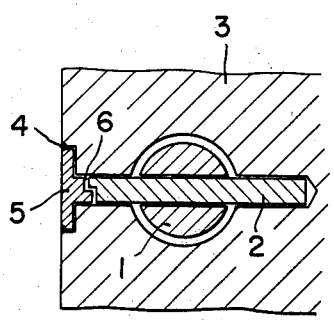
Figure 7:
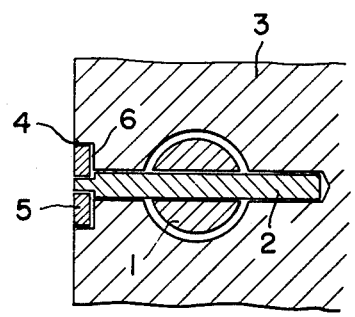
Figure 5:
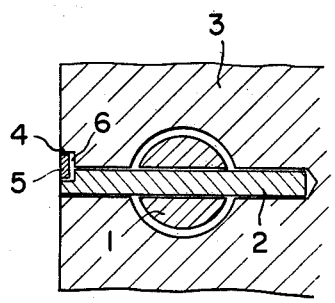
Figure 8:
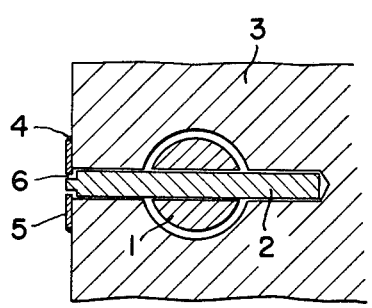

FIG. 3 through FIG. 8 show various embodiments according to this invention, in which a pin 2 for supporting a control rod guide roller 1 is not directly welded to a control rod 3 but is engaged with a fixing member 5, with a small clearance 6, which is welded to the control rod 3 as designated by reference numeral 4 so as to prevent rotation of the supporting pin 2.

According to these embodiments, when the fixing member 5 is welded to the control rod, the applied welding heat does not directly transfer to the supporting pin 2 because of the presence of the small clearance 6, thereby considerably reducing the degradation of the quality of the material of which the supporting pin consists. Although, in FIG. 3 through FIG. 8, various examples of the engagements of the pin 2 with the fixing member 5 at the upper portion of the control rod 3 are shown, substantially the same engaging manners may be applicable to the pin 2 and the fixing member at the lower portion thereof.

It is preferable to manufacture the supporting pin 2 with one of the following materials, i.e., a nickel-based alloy obtained by precipitation hardening, a nickel-based alloy hardened by cold or warm working, or a stainless steel hardened by cold or warm working. This is because these materials are excellent in corrosion proof characteristic even in water at a high temperature in use as well as wear proof characteristic and because the strengths and elongations can be easily adjusted to the most desirable extents by controlling a material working process. Moreover, although it is generally required to select different materials for manufacturing the supporting pin 2 and the control rod guide roller 1 for preventing galling at the engaging surfaces therebetween, according to this invention, various kinds of combinations of suitable materials can be selected from the materials described above in view of problems regarding friction and wear. Furthermore, the supporting pins 2 made of the materials described above includes considerably less cobalt than is included in a conventional supporting pin made of a cobalt-based alloy; thus the emission of cobalt, i.e., radioactive cobalt 60 in $n_0^1 - \gamma$ reaction, in the reactor core will be extremely suppressed.

Regarding the fixing member 5 according to this invention, although the member is made of a low-carbon stainless steel or a nickel-based alloy which was not effected by precipitation hardening, this is because these materials show excellent resistance to corrosion. Therefore, the welded portion between the fixing member 5 and the control rod 3 is hardly subjected to cracks due to corrosion and strain, or welding operation.

According to this invention, the fixing member 5 may be secured to the control rod 3 by screwing, caulking or a combination thereof instead of welding.

Examples of a control rod provided with supporting pins and fixing members according to this invention will be described hereunder in comparison with a control rod of the prior art.

Figure 9A:
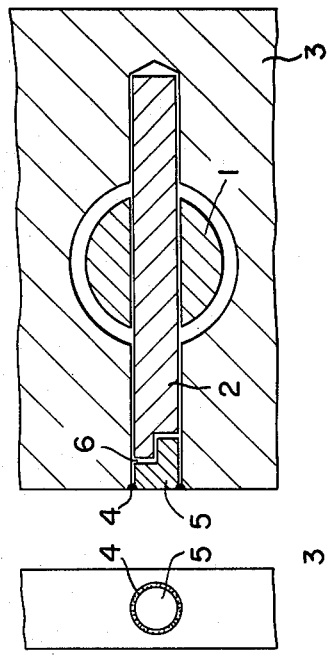

In one example, a supporting pin was made of a cold-worked stainless steel commercially sold under the name of Nitronic 60 (Trade Name, Armco Steel Corporation), consisting of 0.1% or less carbon, 16–18% chromium, 7–9% manganese, 8–9% nickel, 3.5–4.5% silicon, and 0.08–0.18% nitrogen. When the thus made supporting pin was directly welded to the control rod at its peripheral edge as shown in FIG. 9a by passing therethrough a welding current of 50 A for 15 sec., a hardness distribution at several portions on the cross sectional area of the supporting pin with respect to the distance from the periphery to the central portion thereof was obtained as shown in FIG. 9c.

Figure 9B:
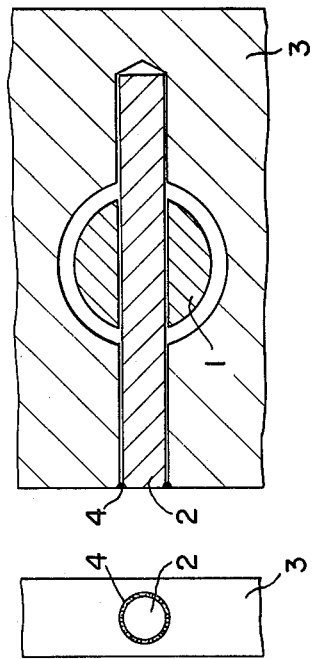
FIG. 9b shows a control rod provided with a supporting pin and a fixing member according to this invention and FIG. 9d shows a hardness distribution of the supporting pin attached as shown in FIG. 9b.
Figure 9C:
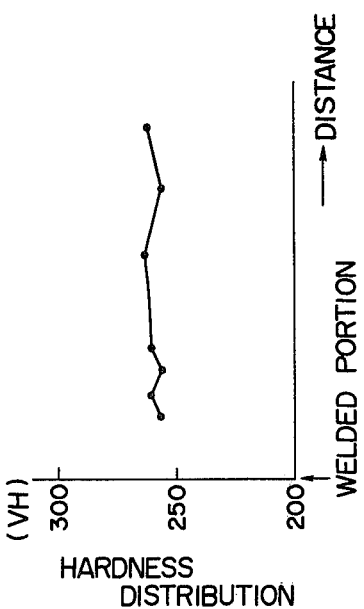
Figure 9D:
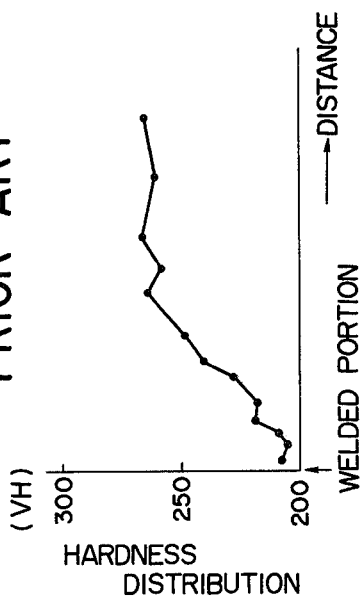

While, when the supporting pin made of the same material, Nitronic 60, was engaged with a small clearance with a fixing member which was made of a material of commercially sold SUS 304L and welded to the control rod as shown in FIG. 9b by passing therethrough a welding current of 50 A for 15 sec., a hardness distribution at several portions on the cross sectional area of the supporting pin with respect to the distance from the periphery to the central portion thereof was obtained as shown in FIG. 9d.

As can be understood from FIGS. 9c and 9d, in the case where the supporting pin was directly welded to the control rod, it was found that the softening of the material of the supporting pin extended to its central portion and the quality of the material was considerably degraded; and in the case where the fixing member was welded to the control rod, the supporting pin was not softened and not degraded in its quality because of the presence of the clearance between the fixing member and the supporting pin.

In other examples utilizing a supporting pin made of a material commercially sold as Inconel (Trade Name, The International Nickel Company Inc. ) in combination with a fixing member made of commercially sold SUS 316L, and utilizing the supporting pin made of a cold worked material commercially sold as Hastelloy C (Trade Name, Cobalt Corporation) in combination with a fixing member made of Inconel, softening of the supporting pins was not observed and preferable results were obtained as in the example described hereinabove.

As described above, the control rod according to this invention is provided with control rod guide roller supporting pins which are hardly damaged by strain or corrosion and the quality of the material of the pins is hardly degraded by the transfer of welding heat.

What is claimed is:

1. In a control rod to be arranged in a nuclear reactor core of the type comprising a body of a control rod, control rod guide rollers attached to said body of the control rod, pins connected to said guide rollers, and fixing members secured to said body of the control rod, the improvement in which each of said pins is made of a material subjected to a hardening treatment and has one end to be engaged with a corresponding one of said fixing members with a clearance therebetween thereby to prevent rotation of said pin with respect to said fixing member, and each of said fixing members comprises a portion to be engaged with a corresponding one of said pins and a portion to be welded to said body of the control rod, said pins being thermally apart from said welded portions of said fixing members and slidably supporting the guide rollers.

2. In a control rod according to claim 1, the further improvement wherein each of said supporting pins is made of at least one member selected from the group consisting of a nickel-based alloy obtained by precipitation hardening, a nickel-based alloy hardened by cold or warm working, and a stainless steel hardened by cold or warm working, and each of said fixing members is made of a low-carbon stainless steel or a nickel-based alloy not effected by precipitation hardening.

* * * * *